(12) United States Patent
Phillips et al.

(10) Patent No.: US 8,474,788 B2
(45) Date of Patent: Jul. 2, 2013

(54) CONTROL UTILIZING NON-CONTACT SWITCHING FOR CONTROL AND CURRENT SENSING TECHNOLOGY FOR OPERATING A VALVE

(76) Inventors: David L. Phillips, Santa Ana, CA (US); Rufino Naval, Jr., San Juan Capistrano, CA (US); Jesus Estrada, Chihuahua (MX)

( * ) Notice: Subject to any disclaimer, the term of this patent is extended or adjusted under 35 U.S.C. 154(b) by 445 days.

(21) Appl. No.: 12/578,725

(22) Filed: Oct. 14, 2009

(65) Prior Publication Data
US 2010/0090140 A1    Apr. 15, 2010

Related U.S. Application Data

(60) Provisional application No. 61/105,171, filed on Oct. 14, 2008.

(51) Int. Cl.
*F16K 31/02*    (2006.01)
(52) U.S. Cl.
USPC .................... 251/129.04; 137/624.11
(58) Field of Classification Search
USPC ........... 251/129.01, 129.04; 137/552, 624.11; 361/23
See application file for complete search history.

(56) References Cited

U.S. PATENT DOCUMENTS

| | | | |
|---|---|---|---|
| 3,599,867 A | 8/1971 | Griswold et al. | |
| 4,121,610 A | 10/1978 | Harms et al. | |
| 4,406,303 A | 9/1983 | Kilmoyer | |
| 4,816,987 A * | 3/1989 | Brooks et al. | 700/45 |
| 4,844,110 A * | 7/1989 | Paley | 137/1 |
| 5,029,597 A * | 7/1991 | Leon | 137/1 |
| 5,176,164 A | 1/1993 | Boyle | |
| 5,293,551 A | 3/1994 | Perkins et al. | |
| 5,473,497 A * | 12/1995 | Beatty | 361/23 |
| 5,566,702 A * | 10/1996 | Philipp | 137/1 |
| 5,743,133 A * | 4/1998 | Watanabe | 73/168 |
| 6,102,667 A | 8/2000 | Johnson | |
| 6,129,103 A | 10/2000 | Fields et al. | |
| 6,170,798 B1 | 1/2001 | Johnson et al. | |
| 6,279,870 B1 | 8/2001 | Welz, Jr. et al. | |

(Continued)

FOREIGN PATENT DOCUMENTS

| | | |
|---|---|---|
| WO | 9900815 | 1/1999 |
| WO | 2006071967 | 7/2006 |

OTHER PUBLICATIONS

U.S. Appl. No. 60/898,525; Filed by Rodenbeck on Jan. 31, 2007.*
3 Pages International Search Report mailed Jan. 13, 2010.

*Primary Examiner* — John K Fristoe, Jr.
*Assistant Examiner* — R. K. Arundale

(57) ABSTRACT

The present invention provides a control device featuring a control module featuring one or more modules configured to provide a first control signal for controlling a first device in order to open or close a second device; and also configured to respond to a change in a parameter sensed in relation to controlling the first device, and to provide a second control signal for controlling the first device based at least partly on the change in the parameter in relation to time. The first device may be a motor; the second device is a valve; and the parameter may be current. In operation, the first control signal is for turning on the motor in order to open or close the valve, and the second control signal is for turning off the motor in order to open or close the valve.

28 Claims, 3 Drawing Sheets

U.S. PATENT DOCUMENTS

| | | |
|---|---|---|
| 6,286,764 B1 | 9/2001 | Garvey et al. |
| 6,453,215 B1 | 9/2002 | Lavoie |
| 6,871,835 B2 | 3/2005 | Parsons |
| 6,998,807 B2 | 2/2006 | Phillips et al. |
| 7,293,583 B2 | 11/2007 | Arigoni |
| 7,314,370 B2 | 1/2008 | Chian et al. |
| 2003/0097482 A1 | 5/2003 | DeHart et al. |
| 2004/0216477 A1 | 11/2004 | Yamasaki et al. |
| 2006/0266966 A1 | 11/2006 | Karte et al. |
| 2007/0030619 A1 | 2/2007 | Ganev |
| 2007/0246550 A1 | 10/2007 | Rodenbeck et al. |
| 2010/0108165 A1* | 5/2010 | Rodenbeck et al. .......... 137/801 |

* cited by examiner

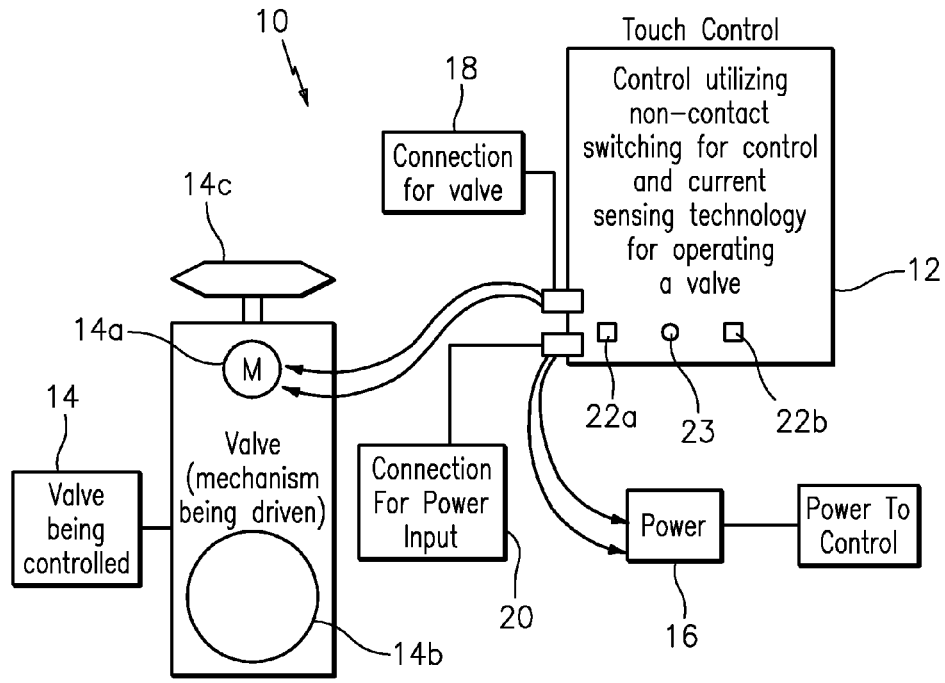

FIG. 1

Control module or device 12 (e.g. micro-controller)

One or more modules 12a configured to provide a first control signal for controlling a first device (e.g. a motor) in order to open or close a second device (e.g. a valve); and also configured to respond to a change in a parameter sensed in relation to controlling the first device (e.g. the motor), and to provide a second control signal for controlling the first device (e.g. the motor) based at least partly on the change in the parameter in relation to time Touch pad module 12b configured to respond to a touch by a user and provide a touch pad module signal based on a change in a value of a sensing parameter One or more other modules 12c

FIG. 2

CONTROL UTILIZING NON-CONTACT SWITCHING FOR CONTROL AND CURRENT SENSING TECHNOLOGY FOR OPERATING A VALVE

CROSS-REFERENCE TO RELATED APPLICATIONS

This application claims benefit to patent application Ser. No. 61/105,171, filed 14 Oct. 2008, which is hereby incorporated by reference in its entirety.

BACKGROUND OF THE INVENTION

1. Field of the Invention

The present invention relates to a method and apparatus for operating a valve; and more particularly relates to a method and apparatus for operating a valve using a non-contact switching. The present invention may be used in waste systems and bilge pumps.

2. Brief Description of Related Art

Techniques for operating a valve are known in the art.

One known configuration includes a valve having a motor for opening and closing the valve, a switch for controlling the opening and closing of the valve, and a power supply connected to both the valve and the switch.

Moreover, known devices utilize limit switches that are designed into the valves themselves. Typical rocker, toggle or other switches are then used to operate the valves. These require wire harnesses with multiple wires. When the limits of the limit switches are reached, the power is removed.

One problem with these known designs is that the use of the current wiring requires multiple wires to run between the switch, battery and the valves. The switches must be protected from exposure to liquids.

Limit switches are known in the art as electromechanical or solid state devices that require the physical contact of an object with the switch's actuator to make the contacts change state. Rotary limit switches use physically-actuated levers to rotate a shaft and operate the contacts in a switch, making them change state, while linear limit switches are electromechanical devices that require physical contact between a target object and switch activator to make the contacts change state.

SUMMARY OF THE INVENTION

The present invention provides a new and unique control module featuring one or more modules configured to provide a first control signal for controlling a first device in order to open or close a second device; and also configured to respond to a change in a parameter sensed in relation to controlling the first device, and to provide a second control signal for controlling the first device based at least partly on the change in the parameter in relation to time. The control module may take the form of a micro-controller, the first device may take the form of a motor; the second device may take the form of a valve; and the parameter may be current. In operation, the first control signal is for turning on the motor in order to open or close the valve, and the second control signal is for turning off the motor in order to open or close the valve.

By way of example, the control module may form part of a touch control pad or module having touch sensors, where depending on what sensor is touched, the control module may proceed to execute a software subroutine that can be, for example, for the opening or the close of the valve.

The operations of opening and closing of the valve can be performed by the motor. In one embodiment, in order to detect that the motor has reached its limit of opening or close, each time that the micro-controller turns on the motor it also begins to run a continuous subroutine to measure and monitor the current of the motor. Once the valve is completely closed or opened, the current of the motor increases up to a value that depends on the electrical parameters of the particular motor being used, that current is detected by the micro-controller which proceeds to turn off the motor, in accordance with the present invention described herein.

The micro-controller may be connected via a cable and connector to the motor to drive of the valve being driven. The micro-controller can also be used wirelessly or using other methods of operation.

The non-contact switching method of actuation may be in the micro-controller. The term "non-contact" is understood to mean that there is no mechanical switching method. This can take the form of a capacitive, inductive, optic or other types of similar sensing method.

When activated, the control module or micro-controller opens or closes the valve depending upon the user's preference and/or activation.

In operation, when the valve is activated and reaches a mechanical stop, the current in the motor will typically be increased, and the current sensing technology will monitor the current actively and shut off in accordance with the increase of current.

The software routine will also monitor the time of travel and correlate it to open and close the valve. For example, in the event that the time of travel is less than "normal," then the micro-controller can alert the user by visual methods that there may be an issue and the valve may not be fully closed.

The scope of the invention is also intended to include a method featuring providing a first control signal for controlling a first device in order to open or close a second device; responding to a change in a parameter sensed in relation to controlling the first device; and providing a second control signal for controlling the first device based at least partly on the change in the parameter in relation to time. The method may be implemented in relation to the first control signal being for turning on a motor in order to open or close a valve, and the second control signal being for turning off the motor in order to open or close the valve. The method may also include steps for implementing the same consistent with that shown and described herein for operating such a motor for opening or closing such a valve, as well as other suitable device combinations either now known or later developed in the future.

The scope of the invention is also intended to include apparatus featuring in combination a valve configured with a motor and with a conduit for allowing a passage of a substance based at least partly on whether the valve is either open or closed; and a control module having one or more modules configured to provide a first control signal for controlling the motor in order to open or close the valve; and also configured to respond to a change in a parameter sensed in relation to controlling the motor, and to provide a second control signal for controlling the motor based at least partly on the change in the parameter in relation to time, where the first control signal may be turning on the motor; the second control signal may be for turning off the motor; and the parameter being sensed may be current.

The control module or micro-controller is also coupled to a power supply and supplies the power to the motor in the valve via the associated cable and connection described above.

In effect, by utilizing capacitive, inductive, or other contact type of activation and the current sensing control there are only two wires required to go between the control module and the valve. There is no requirement for limit switches in the valve itself. This type of touch switch is sealed to exposure of the elements.

BRIEF DESCRIPTION OF THE DRAWING

The drawing includes the following Figures:

FIG. 1 is a diagram of a system showing an implementation according to some embodiments of the present invention.

FIG. 2 is a diagram of a touch control, control module, control device or micro-controller according to some embodiments of the present invention.

FIG. 3, including

DETAILED DESCRIPTION OF THE INVENTION

Figure 3A:
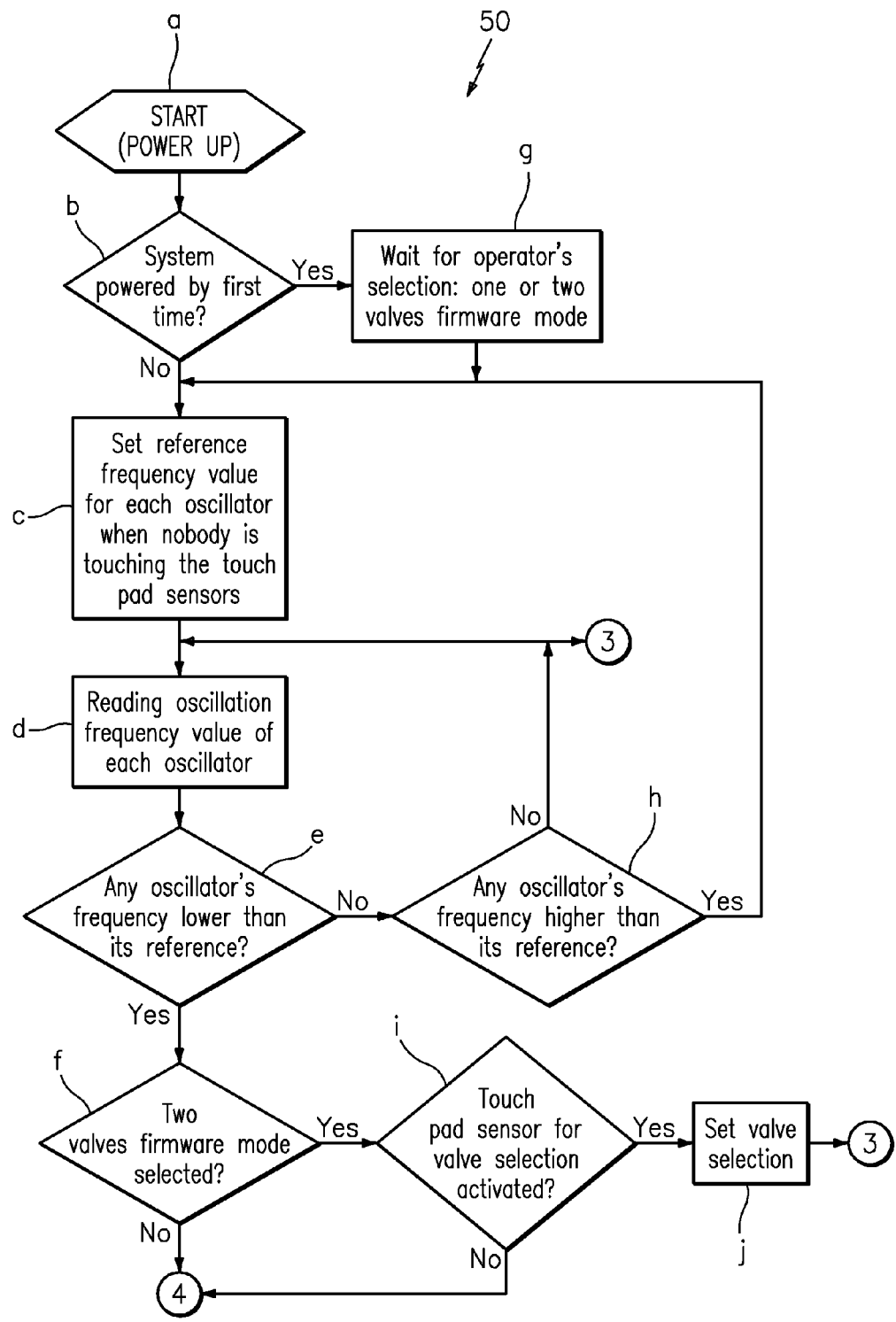
FIGS. 3a, 3b, 3c and 3d, is a flowchart showing steps of a routine for implementing some embodiments of the present invention.

FIG. 1 shows a typical apparatus, system or installation generally indicated as 10 envisioned according to some embodiments of the present invention. The apparatus, system or installation 10 includes a touch control, control module, control device or micro-controller 12, a valve 14 having a motor 14a to be controlled and a power supply or module 16 for providing power. However, the scope of the invention is not intended to be limited to any such apparatus, system or installation having a valve with a motor for controlling the same. For example, the scope of the invention is intended to include other type or kinds of apparatuses, systems and installations both now known and later developed in the future in which such a control module 12 can be used to control a different type or kind of first device, for in turn controlling a different type or kind of second device.

By way of example, the control module 12 is shown and described herein in the form of a control utilizing non-contact switching having control and current sensing technology for operating the valve 14. The non-contact switching method of actuation may be in the control, where the term "non-contact" is understood to mean that there is no mechanical switching method. This can take the form of a capacitive, inductive, optic or other types of similar sensing method. As shown, the control module 12 includes a cable or connection 18 for coupling the control module 12 to the motor 14a of the valve 14 and a cable or connection 20 for coupling the control module 12 to the power module 16 for receiving a power input. Embodiments are also envisioned in which the control module 12 can also be used wirelessly or using other methods of operation either now known or later developed in the future for coupling the control module 12 to the motor 14a of the valve 14.

The valve 14 includes the motor 14a as a mechanism or device being driven by the control module 12, as well as a conduit 14b that may be opened or closed, e.g. by a valve gate (not shown), in relation to the opening and closing of the valve 14. The conduit 14b would typically allow the passage of some substance, e.g. fluid, effluent, etc., including that in a waste system or bilge pump arrangement, although the scope of the invention is not intended to be limited to the type or kind of substance being passed through the conduit 14b. In operation, the motor 14a is controlled by the control module 12 for operating the valve 14. The valve 14 may also include a handle 14c, which does not form part of the underlying invention herein, for manually overriding the valve control described herein in the event, e.g., of a power failure.

FIG. 2 shows the control module 12 in greater detail according to some embodiments of the present invention featuring one or more modules 12a, a touch pad module 12b, as well as other modules 12c that form part of the control module 12 for implementing both functionality associated with or related to the underlying invention, as well as that which does not, as described below.

In operation, the one or more modules 12a is configured for controlling the motor 14a in order to open or close the valve 14. The one or more modules 12a is configured to provide a first control signal for controlling the motor 14a in order to open or close the valve 14; and is also configured to respond to a change in a parameter sensed in relation to controlling the motor 14a, and to provide a second control signal for controlling the motor 14a based at least partly on the change in the parameter in relation to time. In operation, the first control signal is for turning the motor on in order to open or close the valve 14, and the second control signal is for turning the motor off in order to open or close the valve 14.

By way of example, the present invention is described as the first device being the motor 14a and the second device being the valve, although the scope of the present invention is intended to include other combinations of devices either now known or later developed in the future, where the first device opens, closes or somehow controls the operation of the second device. For example, while the operations of opening and closing of the valve 14 can be made using the motor 14a, the scope of the invention is intended to include other techniques for opening and closing the valve either now known or later developed in the future.

In operation, in order to detect that the motor 14a has reached the limit of opening or close, each time that the micro-controller turns on the motor 14a it also begins to run a continuous subroutine to measure the motor's current. Once the valve 14 is completely closed or opened, the current of the motor 14a increases up to a value that depends on the electrical parameters of the motor 14a, that current is detected by the control module or micro-controller 12 which proceeds to turn off the motor 14a, in accordance with that described herein.

Moreover, a software routine will also monitor the time of travel and correlate that to the opening and closing of the valve 14. For example, in the event that the travel time is less than "normal," the control module or micro-controller 12 can alert the user by visual methods, that there may be an issue and the valve may not be fully closed.

The Touch Pad Module 12b

The touch pad module 12a is configured to respond to a touch by a user and provide a touch pad module signal to open or close the valve 14. In operation, the touch pad module 12b responds to a change in a value of a sensing parameter, such as capacitance, and provides the touch pad module signal based on the same. By way of example, the touch pad module signal may be provided to the one or more modules 12a to control the operation of the valve 14 according to the present invention. According to some embodiments of the present invention, the touch pad module 12a may include capacitive sensing technology having touch pad sensors 22a, 22b having one or more capacitive sensors, oscillators, etc. Such capacitive sensing technology is known in the art and the scope of the invention is not intended to be limited to any particular type or kind thereof. The scope of the invention is also intended to be limited to the same, and is intended to include other touch sensing technologies either now known or later developed in the future.

In operation, each capacitive sensor can have an inherent capacitance value and this value may be increased every time the user touches a respective capacitive sensor. Each capacitive sensor may also be connected to an oscillator, so the number of oscillators in the circuit is equal to the number of capacitive sensors. In operation, the frequency of an oscillator can depend on the touch sensor's capacitance connected to it and may be inversely proportional.

FIG. 3

The Flowchart 50

FIG. 3 shows a flowchart generally indicated as 50 of a software routine having a set of steps a, b, c, . . . , q and r.

In general, each time that the system 10 (FIG. 1) is powered the control module or micro-controller 12 can realize a frequency measurement for each oscillator in the touch pad sensing technology connected to it, which is the base line or reference value to subsequent measurements. After a first reading of each oscillator's frequency, any subsequent reading can be compared to its reference value. If the frequency value is less than the reference, then this means that the corresponding touch sensor is being touched. However, a security band gap may be also used to discriminate small frequency variations due to components tolerance and electrical parameters that depends on the environment. Depending on what sensor is touched, the control module or micro-controller 12 may proceed to execute a software subroutine that could be, for example, for the opening or the close of the valve 14.

In FIG. 3a, when the system 10 is started or powered up, the routine executes step a to start or power up the system 10. In step b, the routine determines if the system 10 is powered up for the first time. If yes, then the routine executes step g and waits for an operator's selection, e.g., for one or two valves in a firmware mode. If no, then the routine executes step c and sets a reference frequency value for each oscillator when nobody is touching the touch pad sensors, moves to step d, reads an oscillation frequencies value of each oscillator, and moves to step e. In step e, the routine determines if any oscillator frequency is lower than its reference. If yes, then the routine executes step h. If no, then the routine executes step f. In step h, the routine determines if any oscillator frequency is higher than its reference. If yes, then the routine goes back and executes step c. If no, then the routine goes back and executes step d. If the routine determines that any oscillator frequency is lower than its reference in step e, then the routine executes step f and determines if a two values firmware mode is selected. If yes, then the routine executes some combination of the steps k-p set forth in FIG. 3b starting at node 4. If no, the routine executes step i and determines if a touch pad sensor for a value selection is activated. If yes, then the routine executes step j, determines a set value selection, and executes step d as indicated by the corresponding node 3. If no, then the routine executes some combination of the steps k-p set forth in FIG. 3b starting at node 4.

Figure 3B:
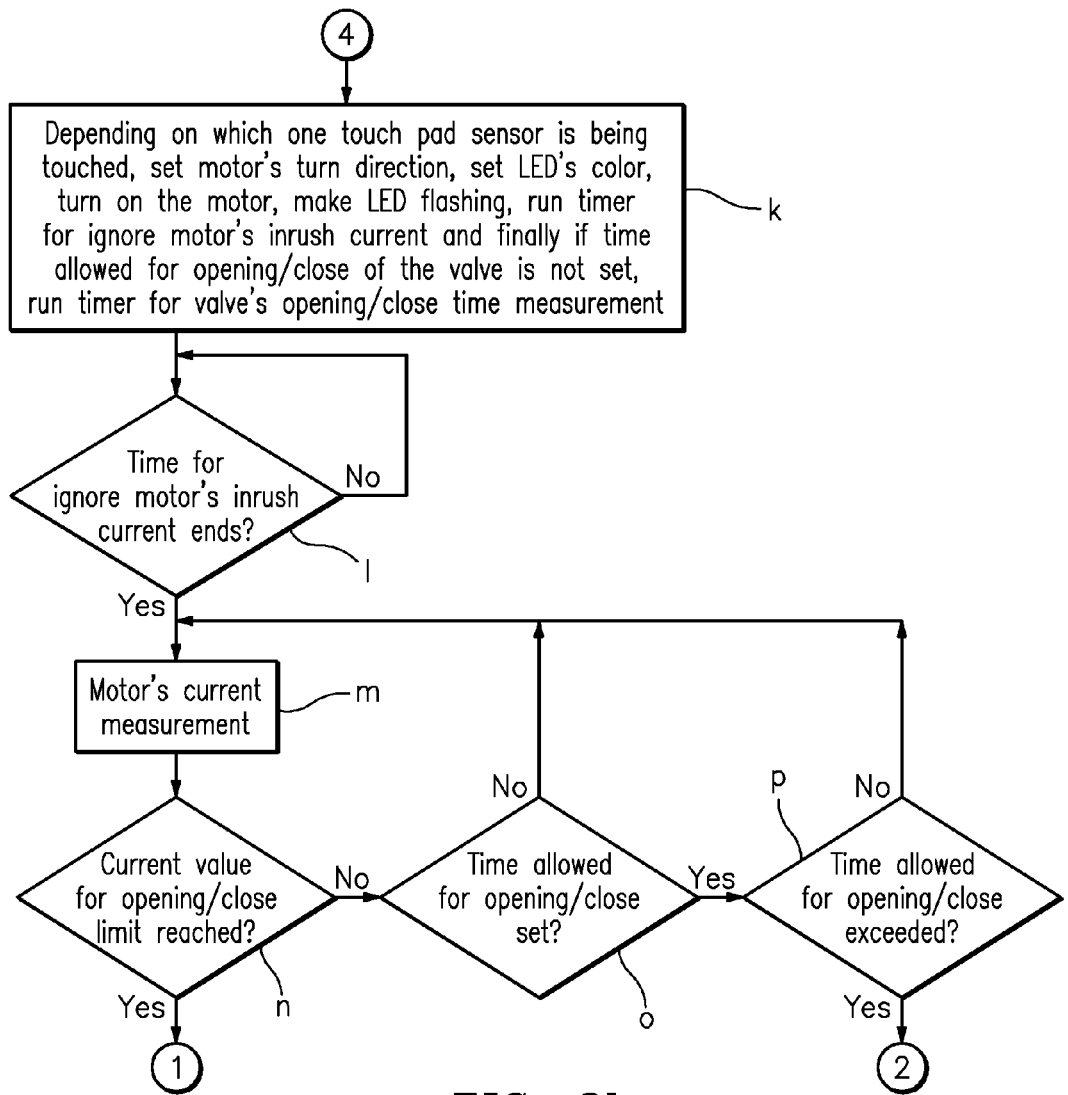

In FIG. 3b, the routine executes step k, and depending on which one of the touch pad sensors 22a, 22b is being touched, sets the turn direction of motor 14, sets the color for the LED 23, turns "on" the motor 14a, make the LED 23 flash, runs a timer (not shown) for ignoring the inrush current of the motor 14a, and if the time allowed for opening/closing of the valve 14 is not set, then runs a timer for a time measurement of the opening/closing of the valve 14, and moves to step l. In step l, the routine determines if the time for ignoring the inrush current of the motor 14a has ended. If no, then the routine re-executes step l. If yes, then the routine executes step m and takes a current measurement of the motor 14a, and moves to step n. (It is noted that the control module or micro-control 12 is configured to provide the power to the motor 14a, consistent with that described herein, routines for taking the current measurement of the motor 14a are known in the art, and the scope of the invention is not intended to be limited to any particular type or kind thereof either now known or later developed in the future.) In step n, the routine determines if the current value for opening/closing limit has been reached. If yes, then the routine executes step q in FIG. 3c at node 1. If no, then the routine executes step o and determines if the time allowed for opening/closing is set. If no, then the routine executes step m. If yes, then the routine executes step p and determines if the time allowed for opening/closing is exceeded. If no, then the routine executes step m. If yes, then the routine executes step r in FIG. 3d at node 2.

Figures 3C, 3D:
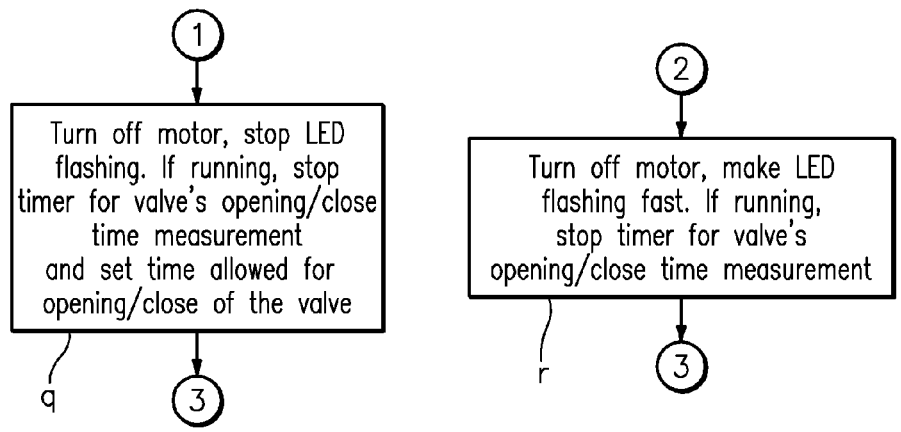

In FIG. 3c, the routine executes step q, turns off the motor 14a; stops the LED 23 flashing; if running, stops the timer for the valves opening/closing time measurement and sets the time allowed for opening/closing of the valve 14; and moves to step d at node 3 in FIG. 3a.

In FIG. 3d, the routine executes step r, turns off the motor 14a; makes the LED 23 flash faster; if running, stops the timer for the valves opening/closing time measurement; and moves to step d at node 3 in FIG. 3a.

The Other Modules 12c

The control module 12 may include other modules 12c for performing functionality including the implementation of a wireless communication scheme, or providing power to the motor 14a, as well as other functionality that does not form part of the underlying invention and is not described herein. Such other functionality may include functionality associated with or related to the implementation of the present invention performed by the one or more modules 12a, 12b or some combination thereof, including the implementation of basic input/output functions.

Other Implementations of the Functionality of the Control Module

The scope of the invention is not intended to be limited to the specific implementation of the modules 12a, 12b, 12c shown in FIG. 2 in order to provide the functionality of the control module 12. For example, embodiments are envisioned in which other circuit arrangements using other circuit components either now known or later developed in the future that may be used to achieve the desired functionality.

Further, consistent with that described herein, the functionality of the control module may be implemented using other configurations of hardware, software, firmware, or a combination thereof, although the scope of the invention is not intended to be limited to any particular embodiment thereof. In a typical software implementation, the one or more modules 12a, 12b of the control module 12 may include one or more microprocessor-based architectures having a microprocessor or microcontroller, a random access memory (RAM), a read only memory (ROM), input/output devices and control, data and address buses connecting the same. A person skilled in the art would be able to program such a microprocessor-based implementation to perform the functionality described herein without undue experimentation. The scope of the invention is not intended to be limited to any particular implementation using technology now known or later developed in the future. Moreover, the scope of the invention is intended to include the control module being a stand alone module, as shown, or in the combination with other circuitry for implementing another module.

POSSIBLE APPLICATIONS

Possible applications include motorized valves: gate, ball, and butterfly, other items that are driven by machinery and require a limit switch to stop the sliding portion. The present may be implemented in many different applications or apparatus, including but not limited to waste systems in recreational vehicle, and well as bilge pumps used on marine vessels. There are three main sections that integrate the controller: the oscillators section, the microcontroller section and the capacitive sensor section.

The Scope of the Invention

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein and thereto without departing from the spirit and scope of the present invention.

What we claim:

1. A control module comprising:
one or more modules configured to
provide a first control signal for turning on a motor in order to open or close a valve;
respond to a sensed signal containing information about a current measurement of the motor related to a current limit for opening or closing of the valve;
provide a second control signal for turning off the motor when either of the two conditions are met a first condition being if the current measurement in the sensed signal reaches the current limit for opening and closing the valve, and a second condition being if a measured time of travel for opening or closing the valve exceeds an allowed time for opening or closing the valve when the first condition is not satisfied.

2. A control module according to claim 1, wherein the valve includes the motor for controlling the opening and closing of a valve gate.

3. A control module according to claim 1, wherein the control module is configured to run a software module to monitor the time of travel and correlate that to the opening and closing of the valve.

4. A control module according to claim 1, wherein the one or more modules is configured to respond to a touch control by an operator or user and provide the first control signal so as to provide a touch control utilizing non-contact switching with no mechanical switching.

5. A control module according to claim 1, wherein the one or more modules is configured to measure the time that the motor is on in order to open or close the valve, to compare a measured value of the time to a time limit for the motor to be on in order to open or close the valve, and to provide the second control signal if the measured value exceeds the time limit.

6. A control module according to claim 5, wherein the one or more modules is configured to initially measure the time that the motor is on in order to open or close the valve, and to store the measured value as the time limit for the motor to be on in order to open or close the valve.

7. A control module according to claim 1, wherein the one or more modules is configured to perform some combination of the following:
set a turn direction of the motor;
turn on the motor;
run a timer for ignoring an inrush of current being provided to the motor;
turn off the motor if a current value for opening/closing limit is reached.

8. A control module according to claim 1, wherein the one or more modules is configured to monitor if the motor or valve reaches a mechanical "on" stop or a mechanical "off" stop based at least partly on a sensed increase in a value of the current being provided to the motor, and shut off the motor based at least partly on the sensed increase in the value of the current.

9. A control module according to claim 1, wherein the one or more modules is configured to receive power from a power supply and provide the power to the motor.

10. A control module according to claim 1, wherein the one or more modules is configured to sense a touch control input by an operator or user based at least partly on a technique using capacitive, inductive or optic sensing.

11. A control module according to claim 1, wherein the one or more modules is configured to monitor a time of travel and correlate the time of travel to open and close the valve.

12. A control module according to claim 11, wherein the one or more modules is configured to alert a user with an audio and/or visual alert that the valve is not fully closed in the event that the travel time is less than a normal time of travel.

13. A control module according to claim 1, wherein the one or more modules is configured with an oscillator or oscillator circuit having capacitive sensors, including where each capacitive sensor has an inherent capacitive value that is increased when someone touches the capacitive sensor.

14. A control module according to claim 1, wherein the one or more modules is configured with an oscillator or oscillator circuit having capacitive sensors, including where each capacitive sensor is connected to a respective oscillator, so the number of oscillators in the oscillator circuit is substantially equal to the number of the capacitive sensors.

15. A control module according to claim 14, wherein the oscillator or oscillator circuit is configured so that the frequency of the oscillator depends on a touch sensor capacitance connected to the oscillator and is inversely proportional.

16. A control module according to claim 14, wherein the one or more modules is configured so that each time that a system is powered up the one or more modules realizes a frequency measurement for each oscillator, which is used as a base line or reference value to subsequent measurements.

17. A control module according to claim 14, wherein the one or more modules is configured so that after a first reading of each oscillator's frequency, any subsequent reading can be compared to its reference value, if an oscillator's frequency value is less than its reference value then the one or more modules is configured to determine that a corresponding touch sensor is being touched.

18. A control module according to claim 17, wherein the one or more modules is configured so there is a security band gap to discriminate substantially small or minor frequency variations due to components tolerance and electrical parameters, including frequency variation that depends on the environment.

19. A control module according to claim 1, wherein the one or more modules is configured to execute a software subroutine for the opening or closing of a valve in response to a touch sensor being touched.

20. A control module according to claim 19, wherein the one or more modules is configured to turn on the motor, run a subroutine to measure the current of the motor, detect that the current of the motor increases up to a value that depends on the electrical parameters of the electrical motor once the valve is completely closed or opened, and turn off the motor.

21. A control module according to claim 1, wherein the one or more modules is configured to operate the opening and closing of the valve by controlling the motor.

22. A control module according to claim 19, wherein the one or more modules is configured to detect that the motor has reached a limit of opening or close.

23. A control module according to claim 1, where the control modules comprises:
 a touch pad module configured to respond to a touch by a user and provide a touch module signal to activate/deactivate a valve based on a change in a value of a touch sensing parameter, including capacitance.

24. A method comprising:
 providing a first control signal for turning on a motor in order to open or close a valve;
 responding to a sensed signal containing information about a current measurement of the motor related to a current limit for opening or closing the valve; and
 providing a second control signal for turning off the motor when either of the two conditions are met a first condition being if the current measurement in the sensed signal reaches the current limit for opening and closing the valve, and a second condition being if a measured time of travel for opening or closing the valve exceeds an allowed time for opening the valve when the first condition is not satisfied.

25. A method according to claim 24, wherein the method comprises running a software module to monitor the time of travel and correlate that to the opening and closing of the valve.

26. A method according to claim 24, wherein the method comprises providing the second control signal if the change in the current exceeds a predetermined value.

27. A method according to claim 24, wherein the method comprises providing the first control signal in response a touch pad input by a user or operator.

28. Apparatus comprising:
 a valve configured with a motor and a conduit for allowing the passage of a substance based at least partly on whether the valve is either open or closed; and
 a control module having one or more modules configured to
 provide a first control signal for turning on the motor in order to open or close the valve;
 respond to a sensed signal containing information about a current of the motor related to a current limit for opening or closing the valve; and
 provide a second control signal for turning off the motor when either of the two conditions are met a first condition being if the current measurement in the sensed signal reaches the current limit for opening and closing the valve, and a second condition being if a measured time of travel for opening of closing the valve exceeds an allowed time for opening or closing the valve when the first condition is not satisfied.

* * * * *